US012606017B2

(12) United States Patent
Kaneko et al.

(10) Patent No.: US 12,606,017 B2
(45) Date of Patent: Apr. 21, 2026

(54) LID OPENING/CLOSING DEVICE

(71) Applicant: TOYODA GOSEI CO., LTD., Kiyosu (JP)

(72) Inventors: Kenichiro Kaneko, Kiyosu (JP); Kazuki Fujisawa, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 373 days.

(21) Appl. No.: 18/493,988

(22) Filed: Oct. 25, 2023

(65) Prior Publication Data

US 2024/0159093 A1 May 16, 2024

(30) Foreign Application Priority Data

Nov. 10, 2022 (JP) ................................. 2022-180259

(51) Int. Cl.
B60K 15/05 (2006.01)
E05F 7/00 (2006.01)

(52) U.S. Cl.
CPC ...... B60K 15/05 (2013.01); B60K 2015/0515 (2013.01); E05F 7/005 (2013.01); E05Y 2900/534 (2013.01)

(58) Field of Classification Search
CPC ............. B60K 2015/0515; E05F 7/005; E05Y 2900/534
See application file for complete search history.

(56) References Cited

U.S. PATENT DOCUMENTS

| | | | |
|---|---|---|---|
| 9,083,163 | B2 | 7/2015 | Tamaoki et al. |
| 2014/0060920 | A1 | 3/2014 | Tamaoki et al. |
| 2021/0246701 | A1* | 8/2021 | Shin ..................... E05D 15/165 |

FOREIGN PATENT DOCUMENTS

| | | |
|---|---|---|
| DE | 20 2017 003 604 U1 | 1/2018 |
| JP | H06-144027 A | 5/1994 |
| JP | 2012-240443 A | 12/2012 |
| JP | 2020-062902 A | 4/2020 |
| JP | 2020-196301 A | 12/2020 |
| JP | 2022-143182 A | 10/2022 |

OTHER PUBLICATIONS

Office Action issued Oct. 7, 2025 in corresponding Japanese patent application No. 2022-180259 (and English translation).

* cited by examiner

*Primary Examiner* — Dany E Akakpo
(74) *Attorney, Agent, or Firm* — Posz Law Group, PLC

(57) ABSTRACT

A lid opening/closing device includes: a base member provided with an opening; a lid configured to open/close the opening; and a positioning portion configured to position at least a vertical position of the lid relative to the base member at a closed position of the lid. The positioning portion includes an engagement recess portion provided to the base member in a recess shape, and an engagement projection portion provided to the lid in a projection shape and configured to be engaged with the engagement recess portion at least in an up-down direction at the closed position of the lid. The engagement recess portion includes a rib extending in the up-down direction at the closed position of the lid. The rib is engaged at a distal end thereof with the engagement projection portion at the closed position of the lid.

6 Claims, 4 Drawing Sheets

LID OPENING/CLOSING DEVICE

TECHNICAL FIELD

The present invention relates to a lid opening/closing device capable of opening/closing a lid for opening/closing an opening of a base member that is mounted on a vehicle body, for example.

BACKGROUND ART

Hitherto, a lid opening/closing device mounted on a vehicle and including a lid for opening/closing an opening of a base member has been known (e.g., Japanese Laid-Open Patent Publication No. 2012-240443). The base member is, for example, a base member that is mounted on a vehicle body to expose a charge port, a fuel port, or the like of the vehicle. In addition, the lid is a lid member that is opened/closed between a closed position at which the lid member closes the opening of the base member and an opened position at which the lid member opens the opening. In the lid opening/closing device described in Japanese Laid-Open Patent Publication No. 2012-240443, the base member is provided with an engagement recess portion, and the lid is provided with an engagement projection portion. The engagement recess portion of the base member and the engagement projection portion of the lid are brought into engagement with each other at the closed position of the lid to position the lid relative to the base member.

SUMMARY OF INVENTION

Technical Problem

Meanwhile, in the structure in which the engagement recess portion and the engagement projection portion are brought into engagement with each other at the lid closed position as described above, if the engagement recess portion and the engagement projection portion are configured so as to oppose each other in the up-down direction at the time of engagement such that the surfaces thereof are butted against each other, the area of contact between the engagement recess portion and the engagement projection portion or the area of the portion where the surfaces thereof are close to each other in the engagement state therebetween becomes large. Therefore, especially in winter, even if the amount of water accumulating between the engagement recess portion and the engagement projection portion is not very large, a region where the water accumulating between the engagement recess portion and the engagement projection portion in the engagement state is frozen spans over a wide range, so that the base member and the lid are likely to be fixed to each other due to freezing at the lid closed position.

The present invention has been made in view of such circumstances, and an object of the present invention is to provide a lid opening/closing device capable of preventing a base member and a lid from being fixed to each other due to freezing at a lid closed position.

Solution to Problem

An aspect of the present invention is directed to a lid opening/closing device including: a base member provided with an opening; a lid configured to be opened/closed between a closed position at which the lid closes the opening and an opened position at which the lid opens the opening; and a positioning portion configured to position at least a vertical position of the lid relative to the base member at the closed position of the lid, wherein the positioning portion includes an engagement recess portion provided to one of the base member and the lid in a recess shape, and an engagement projection portion provided to another of the base member and the lid in a projection shape and configured to be engaged with the engagement recess portion at least in an up-down direction at the closed position of the lid, one of the engagement recess portion and the engagement projection portion includes a rib extending in the up-down direction at the closed position of the lid, and the rib is engaged at a distal end thereof with another of the engagement recess portion and the engagement projection portion at the closed position of the lid.

With this configuration, the base member and the lid are prevented from being fixed to each other due to freezing at the lid closed position.

DESCRIPTION OF EMBODIMENTS

Hereinafter, a specific embodiment of the lid opening/closing device according to the present invention will be described with reference to FIG. 1 to FIG. 8.

A lid opening/closing device 1 according to the embodiment is a device for opening/closing a lid with respect to a base member.

The lid opening/closing device 1 is mounted, for example, on a vehicle such as a gasoline vehicle, a diesel vehicle, an electric vehicle, and a hybrid vehicle, and is installed in a mounting hole 2a provided in a vehicle body surface 2 of a vehicle body side portion, a vehicle body front portion, or the like. For example, a supply port (specifically, a charge port, a fuel port, or the like: see FIG. 2) 3 for supplying energy to the vehicle is placed on a far side of the mounting hole 2a. In the present embodiment, directions are indicated on the basis of the case where the lid opening/closing device 1 is viewed from the outside of the vehicle, as appropriate, a direction connecting the outer side (near side) of the vehicle and the inner side (far side) of the vehicle is referred to as front-back direction X, a horizontal direction along the vehicle body surface 2 is referred to as right-left direction Y, and a vertical direction along the vehicle body surface 2 is referred to as up-down direction Z.

Figure 1:
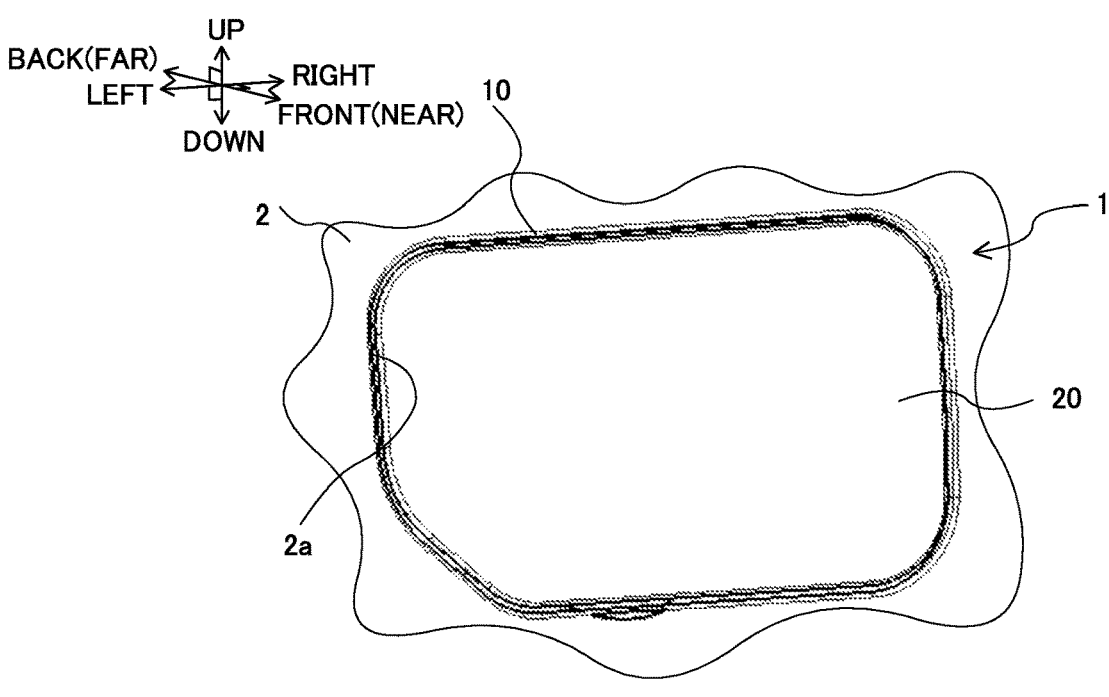
FIG. 1 is a perspective view of a lid opening/closing device mounted on a vehicle according to an embodiment of the present invention, from the front side at a lid closed position.
Figure 2:
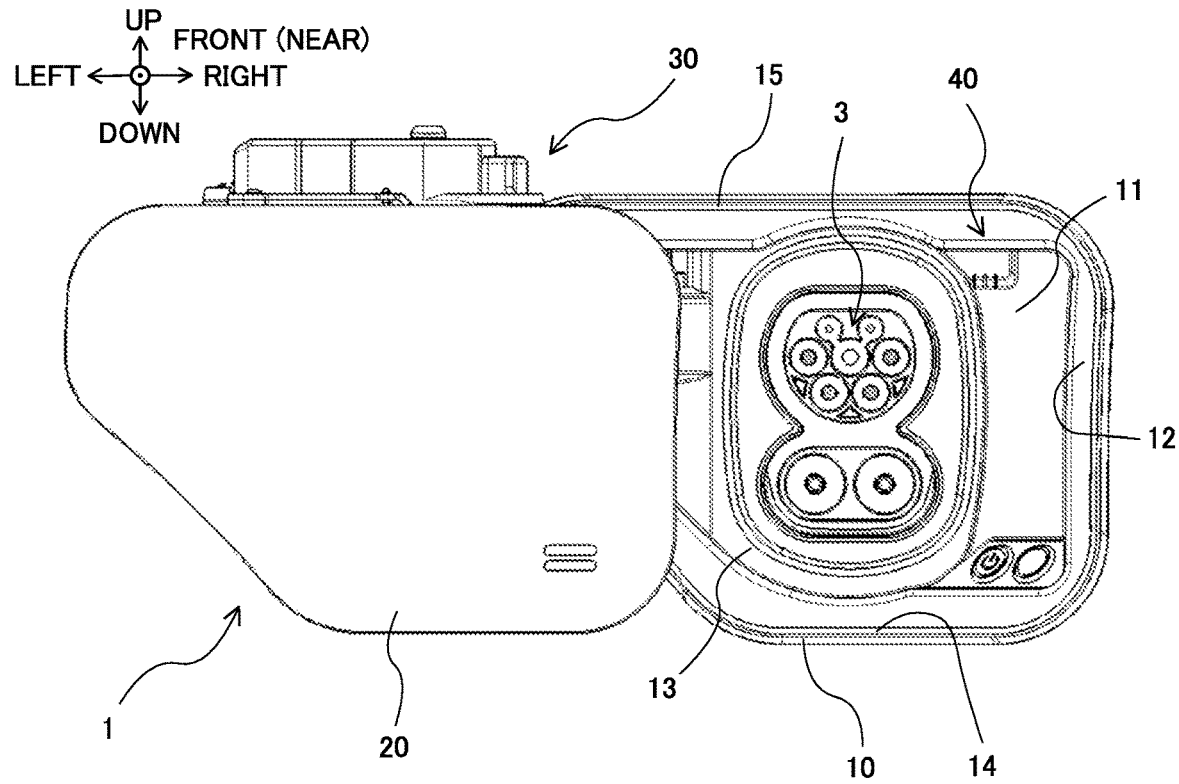
FIG. 2 is a front view of the lid opening/closing device of the embodiment at a lid opened position.

As shown in FIG. 1 and FIG. 2, the lid opening/closing device 1 includes a base member 10, a lid 20, and an opening/closing mechanism 30. The lid opening/closing device 1 transmits power to the lid 20 by drive of the opening/closing mechanism 30, thereby opening/closing the lid 20 with respect to the base member 10.

The base member 10 is a container-like or box-like box member in which the supply port 3 is housed. The base member 10 is mounted and fixed to the vehicle body surface 2 so as to be fitted into the mounting hole 2a. The base member 10 includes a bottom wall portion 11, a side wall portion 12, a housing space 13, and an opening 14. The base member 10 is a bottomed tubular member that is configured such that the bottom wall portion 11 is formed on a far side and the side wall portion 12 surrounds the bottom wall portion 11 to define the housing space 13 and in which the opening 14 is formed on a near side. The base member 10 is an injection-molded article molded from a resin or the like.

The supply port 3 is provided at one end of a pipe or cable connected at another end thereof to a fuel tank, a battery, or the like. The fuel tank or the battery is placed on the far side with respect to a through hole 11a provided in the bottom wall portion 11. The supply port 3 is placed on the near side with respect to the through hole 11a and housed in the housing space 13. While the supply port 3 is hidden on the far side of the lid 20 at the closed position of the lid 20, the supply port 3 is exposed to the outside of the vehicle through the opening 14 at the opened position of the lid 20 so as to allow fuel supply and charging.

The base member 10 includes a frame portion 15. The frame portion 15 is formed in an annular shape along a peripheral portion of the opening 14, and is formed in a flange shape so as to extend in a frame outward direction from the peripheral portion of the opening 14. The base member 10 is positioned on the vehicle body surface 2 by bringing the back surface of the frame portion 15 into contact with a flange surface or the like at the periphery of the mounting hole 2a of the vehicle body surface 2.

The lid 20 is a lid member for opening/closing the opening 14 of the base member 10. The lid 20 is formed in a plate shape. The lid 20 is sized so as to match the opening 14 and the frame portion 15 at the periphery of the opening 14. The lid 20 closes the opening 14 at the closed position of the lid 20 such that the lid 20 is flush with the vehicle body surface 2. The surface of the lid 20 may be curved so as to match the vehicle body surface 2. The lid 20 is, for example, an injection-molded article molded from a resin.

The lid 20 is capable of being opened/closed so as to move between the closed position and the opened position. The closed position is a position at which the lid 20 closes the opening 14. In addition, the opened position is a predetermined position at which the lid 20 opens the opening 14. The lid 20 is supported so as to be movable in position relative to the base member 10. The lid 20 is capable of being opened/closed by power from the opening/closing mechanism 30.

The opening/closing mechanism 30 is a mechanism that opens/closes the lid 20 with respect to the base member 10 between the closed position and the opened position. The opening/closing mechanism 30 is interposed between the base member 10 and the lid 20. The opening/closing mechanism 30 is configured to include an arm, a link, or the like connecting the base member 10 and the lid 20.

The opening/closing mechanism 30 may be, for example, a mechanism that opens/closes the lid 20 by using power generated by an actuator such as a motor, a mechanism that opens/closes the lid 20 by using an external force caused by a manual operation of an operator as power, or a mechanism that opens/closes the lid 20 by selectively using the power generated by the actuator and the external force.

Moreover, the opening/closing mechanism 30 may be a mechanism that uses different types of power sources as a power source for opening the lid 20 and a power source for closing the lid 20. For example, the power source for opening the lid 20 may be an actuator, and the power source for closing the lid 20 may be a manual operation of the operator. Moreover, the opening/closing mechanism 30 may be a mechanism that opens the lid 20 by using an actuator during normal operation but opens the lid 20 through a manual operation of the operator in an emergency such as a failure of the actuator.

Figure 3:
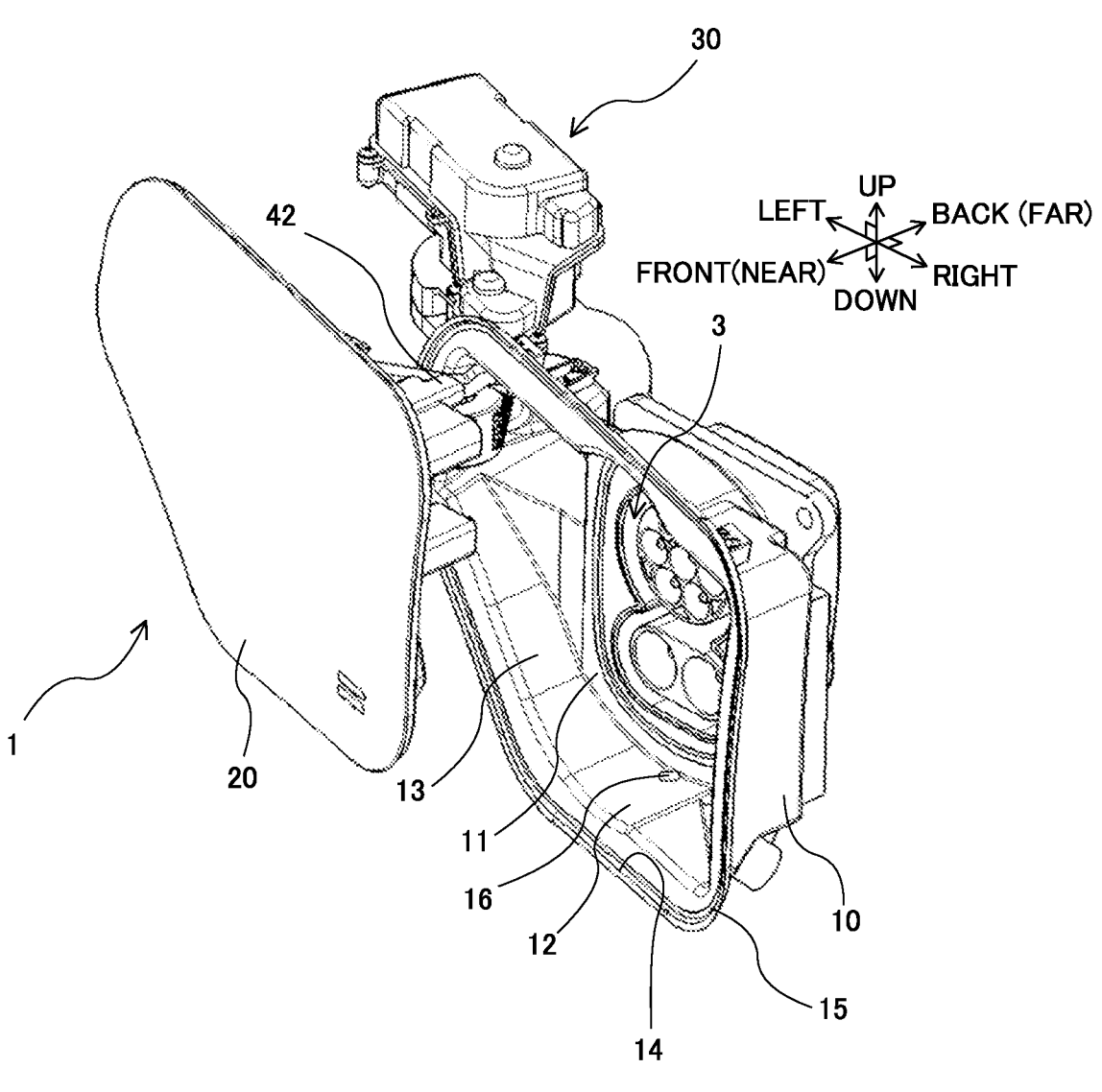
FIG. 3 is a perspective view of the lid opening/closing device of the embodiment at the lid opened position.
Figure 5:
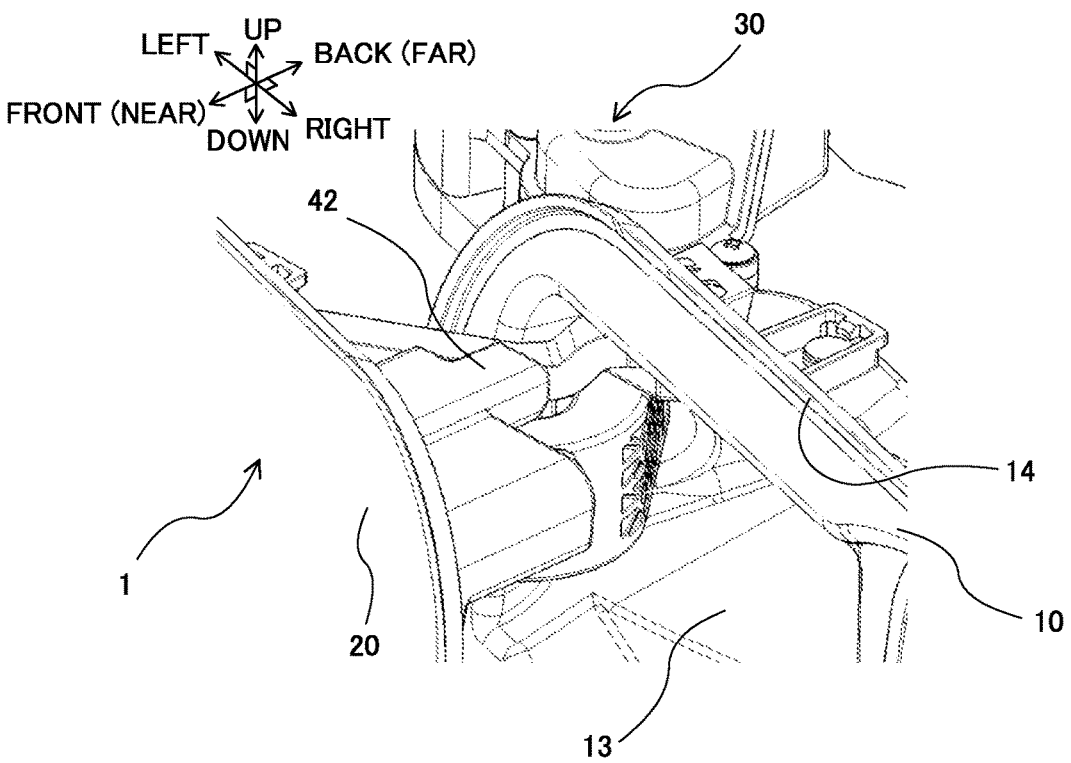
FIG. 5 is a perspective view of a lid included in the lid opening/closing device of the embodiment from the front side.
Figure 6:
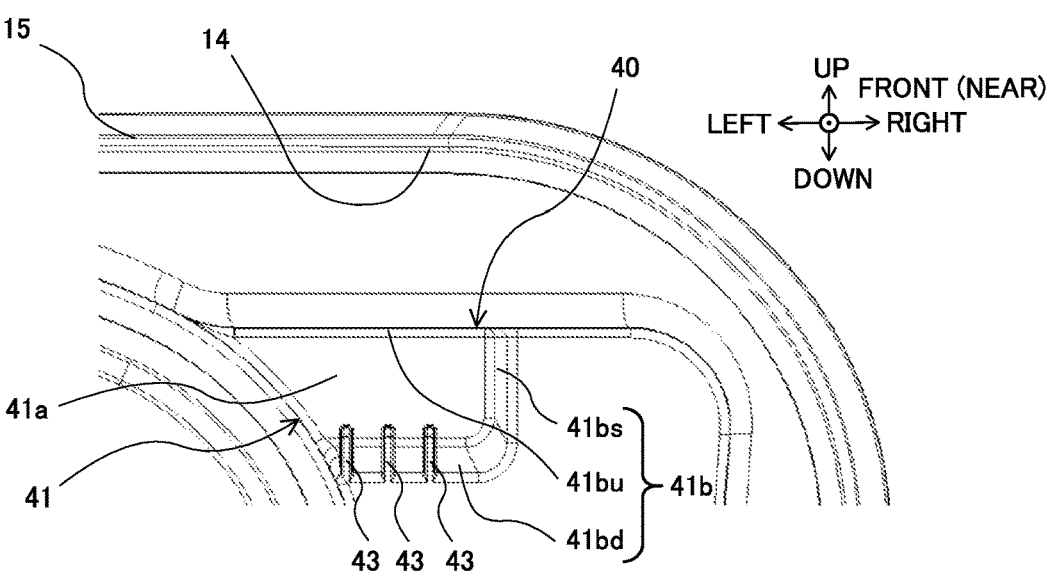
FIG. 6 is a front view of the base member included in the lid opening/closing device of the embodiment.

Furthermore, the opening/closing mechanism 30 may be a sliding type mechanism that moves the lid 20 while maintaining a state where the lid 20 is parallel to the opening 14 when opening/closing the lid 20, or a gooseneck type mechanism that rotates the lid 20 about an axis extending substantially parallel to the opening 14 when opening/closing the lid 20. The direction in which the opening/closing mechanism 30 opens/closes the lid 20 with respect to the base member 10 may be the up-down direction Z or the right-left direction Y. FIG. 2, FIG. 3, and FIG. 5 show the opening/closing mechanism 30 of a sliding type and an opening/closing type in the right-left direction Y.

The direction in which the lid 20 is moved relative to the base member 10 in the vicinity of the closed position by the opening/closing mechanism 30 is preferably the front-back direction X, including the case of the above sliding type mechanism, in order to ensure the sealability of the housing space 13 at the closed position of the lid 20.

The lid opening/closing device 1 includes a positioning portion 40. The positioning portion 40 is a portion that positions at least the vertical position of the lid 20 relative to the base member 10 at the closed position of the lid 20. The positioning portion 40 is provided to the base member 10 and the lid 20. The positioning portion 40 is placed at a position that allows the positioning portion 40 to be located in the housing space 13 at the base member 10 and the lid 20 at the closed position of the lid 20.

The positioning portion 40 includes an engagement recess portion 41 and an engagement projection portion 42. The engagement recess portion 41 and the engagement projection portion 42 are engaged with each other at least in the up-down direction Z at the closed position of the lid 20. The engagement recess portion 41 is provided to the base member 10 in a recess shape. The engagement projection portion 42 is provided to the lid 20 in a projection shape. At least one pair of the engagement recess portion 41 and the engagement projection portion 42 are provided to the base member 10 and the lid 20.

Hereinafter, in the present embodiment, one pair of the engagement recess portion 41 and the engagement projection portion 42 are provided. The one pair of the engagement recess portion 41 and the engagement projection portion 42 are preferably placed on the side (the right side across the supply port 3 in FIG. 2 and FIG. 3) far from the side on which the opening/closing mechanism 30 is placed (the left side in FIG. 2 and FIG. 3) in order to effectively position the lid 20 relative to the base member 10. In addition, this one pair is preferably placed on the upper side with respect to the supply port 3, as shown in FIG. 2, in order to make the side wall portion 12, which is an upper wall of the base member 10, serve as an eave when a person outside the vehicle looks down on the supply port 3 in the housing space 13 of the base member 10 at the opened position of the lid 20, to make the engagement recess portion 41 less likely to be seen.

The engagement recess portion 41 is provided such that a hole or groove is open at least on the near side in the bottom wall portion 11 of the base member 10. The engagement recess portion 41 includes a recessed groove portion 41*a* and a peripheral edge wall portion 41*b*. The recessed groove portion 41*a* is a hole or groove recessed from the surface of the bottom wall portion 11 toward the back side. The peripheral edge wall portion 41*b* is a wall portion provided at the peripheral edge of the recessed groove portion 41*a* to define the recessed groove portion 41*a*. The peripheral edge wall portion 41*b* has an upper wall surface 41*bu*, a lower wall surface 41*bd*, and a side wall surface 41*bs*.

Figure 4:
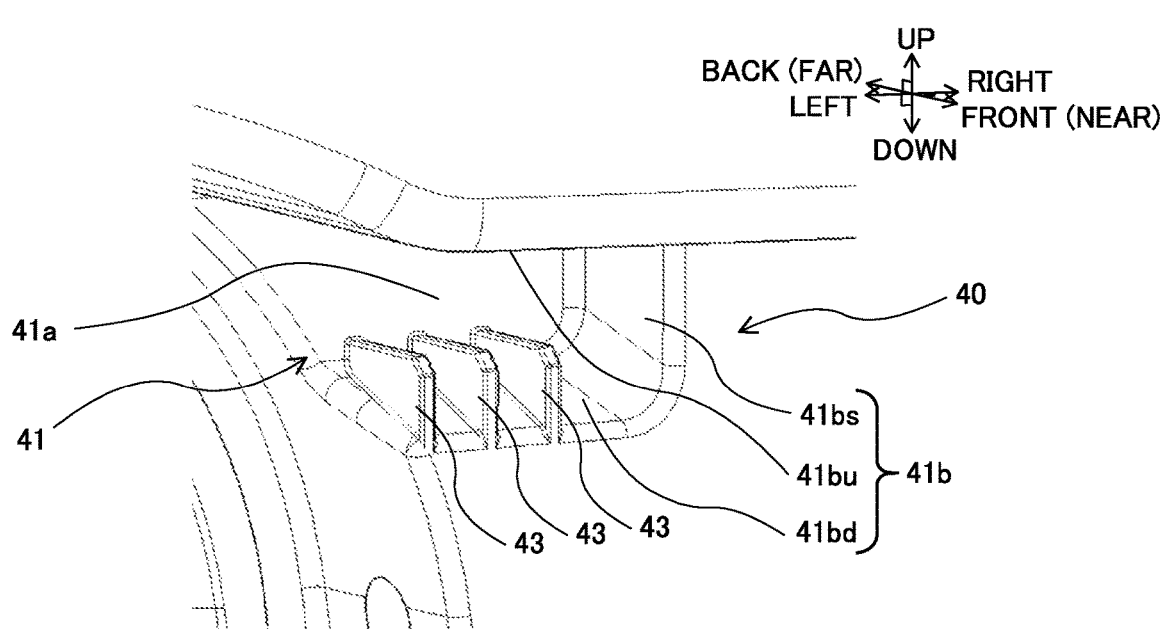
FIG. 4 is a perspective view of a base member included in the lid opening/closing device of the embodiment from the front side.

The peripheral edge wall portion 41*b* does not have to surround all four sides of the recessed groove portion 41*a*, and only has to be provided at least on the upper side and the lower side with respect to the recessed groove portion 41*a*, and the side wall surface 41*bs* is provided only on the right side as shown in FIG. 2 and FIG. 4, and may not necessarily be provided on the left side.

The upper wall surface 41*bu* and the lower wall surface 41*bd* are formed as surfaces opposing each other in the up-down direction Z. The upper wall surface 41*bu* and the lower wall surface 41*bd* are each formed in a flat shape. The upper wall surface 41*bu* extends horizontally (specifically, including the case of extending substantially horizontally). The lower wall surface 41*bd* is inclined with respect to the horizontal. Specifically, as shown in FIG. 4, the lower wall surface 41*bd* is inclined downward from the far side to the near side of the engagement recess portion 41. The inclination angle of the lower wall surface 41*bd* only has to be an angle at which water droplets adhering to the lower wall surface 41*bd* flow on the lower wall surface 41*bd* from the upper side to the lower side and fall from an opening at the lower end of the lower wall surface 41*bd*, and is set to 5° to 30°, for example.

The side wall surface 41*bs* is formed in a flat shape. The side wall surface 41*bs* faces in the right-left direction Y (specifically, the left side in the right-left direction Y when the side wall surface 41*bs* is a right side wall surface), extends along a plane including the up-down direction Z and the front-back direction X, and connects the upper wall surface 41*bu* and the lower wall surface 41*bd*. The side wall surface 41*bs* is provided only on the right side. The recessed groove portion 41*a* of the engagement recess portion 41 is integrated with the housing space 13 so as to be open on the near side, and is integrated with the housing space 13 on the supply port 3 side so as to be open on the left side.

The engagement recess portion 41 includes a rib 43. The rib 43 is a portion that is engaged with the engagement projection portion 42 at the closed position of the lid 20. The rib 43 extends in the up-down direction Z at the closed position of the lid 20. The rib 43 is engageable with the engagement projection portion 42 at a distal end (specifically, an upper end) thereof. The rib 43 only has to be formed so as to include a vertical component in the up-down direction Z orthogonal to the horizontal direction, and may be slightly inclined with respect to the up-down direction Z. The inclination angle of the rib 43 with respect to the up-down direction Z may be, for example, 5° to 30°.

The rib 43 is formed in a plate shape so as to extend from the far side toward the near side of the engagement recess portion 41, that is, in the front-back direction X, while extending in the up-down direction Z at the closed position of the lid 20. The rib 43 is in line contact with the engagement projection portion 42 when being engaged with the engagement projection portion 42 at the distal end thereof. The rib 43 extends so as to project upward from the lower wall surface 41*bd* at the closed position of the lid 20. The rib 43 is formed integrally with the lower wall surface 41*bd*. The distal end of the rib 43 is located above the lower wall surface 41*bd* (specifically, the upper end on the far side thereof). The rib 43 only has to be formed such that the height thereof from the lower wall surface 41*bd* is at least 1 mm, and is, for example, formed such that the height thereof on the near side is in the range of 6 mm to 8 mm and the height thereof on the far side is in the range of 1 mm to 2 mm.

Only one rib 43 may be provided, but providing a plurality of ribs 43 is preferable for stable engagement between the engagement recess portion 41 and the engagement projection portion 42. Hereinafter, in the present embodiment, the engagement recess portion 41 includes three ribs 43. FIG. 2, FIG. 4, FIG. 6, and FIG. 7 show the engagement recess portion 41 in which three ribs 43 are provided. In addition, the plurality of ribs 43 only have to be placed and configured such that each interval in the right-left direction Y between the ribs 43 is at least 2 mm, and the interval is, for example, in the range of 4 mm to 5 mm.

The engagement projection portion 42 projects from the back surface of the lid 20 toward the far side at the closed position of the lid 20. The engagement projection portion 42 is formed with a size corresponding to the recessed groove portion 41*a* of the engagement recess portion 41. The engagement projection portion 42 extends in a columnar or tubular shape along the front-back direction X. The engagement projection portion 42 is formed so as to have a quadrangular cross-section. The engagement projection portion 42 is fitted into the recessed groove portion 41*a* of the engagement recess portion 41 at the closed position of the lid 20, and the outer surface (particularly the lower surface) of the engagement projection portion 42 is engaged with the distal end of each rib 43 of the engagement recess portion 41.

The direction in which the engagement projection portion 42 extends from the back surface of the lid 20 only has to be matched with the direction of movement of the lid 20 relative to the base member 10 in the vicinity of the closed position during opening/closing of the lid 20, and only has to include a component in the front-back direction X. The direction in which the engagement projection portion 42 extends may be inclined with respect to the direction of movement of the lid 20 relative to the base member 10. The inclination angle of the engagement projection portion 42 with respect to this direction of movement may be, for example, 5° to 30°.

In order to prevent the base member 10 and the lid 20 from being fixed to each other due to freezing, the positioning portion 40 is preferably configured such that, when the distal end of each rib 43 of the engagement recess portion 41 of the base member 10 and the outer surface of the engagement projection portion 42 of the lid 20 are engaged with each other, the outer surface of the engagement projection portion 42 is not in contact with the peripheral edge wall portion 41*b* of the engagement recess portion 41 (particularly the upper wall surface 41*bu*, the lower wall surface 41*bd*, and the side wall surface 41*bs*). Furthermore, in order to prevent the base member 10 and the lid 20 from being fixed to each other due to freezing, preferably, during this engagement, the distal end of the engagement projection portion 42 of the lid 20 is not in contact with a wall on the far side of the engagement recess portion 41 of the base member 10.

Next, the operation of the lid opening/closing device 1 will be described.

In the lid opening/closing device 1, when the lid 20 is at the closed position, the engagement projection portion 42 of the lid 20 is fitted into the recessed groove portion 41*a* of the engagement recess portion 41 of the base member 10 and engaged with each rib 43 of the engagement recess portion 41, so that the lid 20 is positioned relative to the base member 10 at least in the up-down direction Z.

When a predetermined opening operation is performed by the operator when the lid 20 is at the closed position as described above, the opening/closing mechanism 30 generates power for opening the lid 20. When this power is generated, the lid 20 is opened from the closed position toward the opened position with respect to the base member 10. Immediately after the start of opening of the lid 20, the engagement projection portion 42 of the lid 20 is pulled out of the recessed groove portion 41*a* of the engagement recess portion 41 of the base member 10, so that the engagement projection portion 42 and the engagement recess portion 41 are disengaged from each other.

When a predetermined closing operation is performed after the lid 20 reaches the opened position, the opening/closing mechanism 30 generates power for closing the lid 20. When this power is generated, the lid 20 is closed from the opened position toward the closed position with respect to the base member 10. Immediately before the end of closing of the lid 20, the engagement projection portion 42 of the lid 20 is inserted and fitted into the recessed groove portion 41*a* of the engagement recess portion 41 of the base member 10 and engaged with each rib 43 of the engagement recess portion 41. When this engagement occurs, the lid 20 is positioned relative to the base member 10 at least in the up-down direction Z.

Therefore, in the lid opening/closing device 1, when the lid 20 is opened/closed with respect to the base member 10 by the opening/closing mechanism 30, the engagement recess portion 41 of the base member 10 and the engagement projection portion 42 of the lid 20 are brought into engagement with each other, or are disengaged from each other.

In the lid opening/closing device 1, the engagement between the engagement recess portion 41 of the base member 10 and the engagement projection portion 42 of the lid 20 is achieved by the engagement between the distal end of each rib 43 of the engagement recess portion 41 and the outer surface of the engagement projection portion 42. With this engagement structure, the area of contact between the engagement recess portion 41 and the engagement projection portion 42 or the area of the portion where the surfaces thereof are close to each other in the engagement state therebetween is reduced. Therefore, water accumulating between the engagement recess portion 41 and the engagement projection portion 42 is made less likely to be frozen, or even when the water is frozen, the region where the water is frozen is limited to a narrow range.

Therefore, in the lid opening/closing device 1, the base member 10 and the lid 20 are prevented from being fixed to each other due to freezing at the closed position of the lid 20, and even if such fixation occurs, the lid 20 is opened with respect to the base member 10 with a small force.

In the lid opening/closing device 1, each rib 43 extends so as to project upward from the lower wall surface 41*bd*, and the lower wall surface 41*bd* of the engagement recess portion 41 is inclined with respect to the horizontal at the closed position of the lid 20. With this inclination structure, even if water enters the lower wall surface 41*bd*, the water flows on the lower wall surface 41*bd* from the upper side to the lower side and is discharged from the lower end (near side) of the lower wall surface 41*bd* to the outside. Therefore, water is made less likely to accumulate on the lower wall surface 41*bd*, so that expansion of a frozen range where water between the engagement recess portion 41 and the engagement projection portion 42 is frozen along with accumulation of a large amount of water on the lower wall surface 41*bd* is suppressed. Accordingly, the performance of preventing the base member 10 and the lid 20 from being fixed to each other due to freezing at the lid closed position is improved.

The water discharged from the lower end of the lower wall surface 41*bd* to the outside as described above falls toward the lower part of the housing space 13. Accumulation of the falling water in the housing space 13 is not preferable for preventing water from entering the supply port 3. Therefore, providing a water drain hole 16 (see FIG. 3) at the lower part (particularly the lowest end) of the housing space 13 in the base member 10 such that water is discharged from the housing space 13 to the outside is suitable, and providing a water passage such that water is easily collected at the lower part of the housing space 13 is further suitable.

Meanwhile, in the above embodiment, the engagement recess portion 41 of the positioning portion 40 is provided to the base member 10 in a recess shape, and the engagement projection portion 42 is provided to the lid 20 in a projection shape. However, the present invention is not limited thereto, and may be applied to a configuration in which the engagement recess portion 41 of the positioning portion 40 is provided to the lid 20 in a recess shape and the engagement projection portion 42 is provided to the base member 10 in a projection shape.

Figure 8:
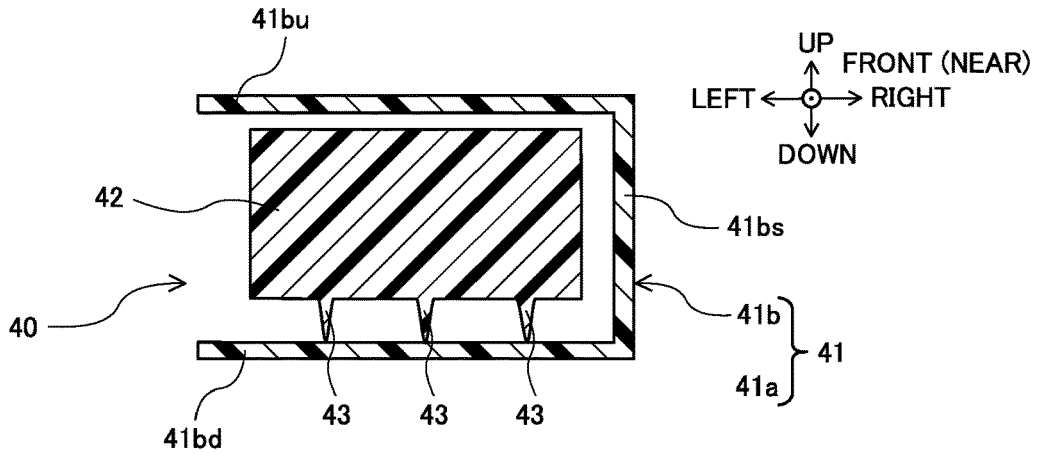
FIG. 8 is a cross-sectional view illustrating a positional relationship between a base member and a lid at a lid closed position of a lid opening/closing device according to another embodiment of the present invention.

In the above embodiment, the engagement recess portion 41 includes the ribs 43 extending in the up-down direction Z at the closed position of the lid 20. However, the present invention is not limited thereto, and may be applied to a configuration in which the engagement projection portion 42 includes ribs 43 extending in the up-down direction Z at the closed position of the lid 20 as shown in FIG. 8.

In the above embodiment, each rib 43 extends upward from the lower wall surface 41*bd* of the engagement recess portion 41, and the lower surface of the engagement projection portion 42 is engaged with the distal end (specifically, the upper end) of the rib 43. That is, the engagement of each rib 43 between the engagement recess portion 41 and the engagement projection portion 42 is performed only on the lower side of the engagement projection portion 42. However, the present invention is not limited thereto, and may be applied to a configuration in which the engagement of each rib 43 between the engagement recess portion 41 and the engagement projection portion 42 is performed only on the upper side or the right side of the engagement projection portion 42, or a configuration in which such engagement is performed on any two or more of the lower side, the upper side, and the right side. This modification may be applied to a configuration in which each rib 43 extends downward from the lower surface of the engagement projection portion 42 and the lower wall surface 41*bd* of the engagement recess portion 41 is engaged with the distal end (specifically, the lower end) of the rib 43.

In the above embodiment, each rib 43 extends so as to project upward from the lower wall surface 41*bd* of the engagement recess portion 41 included in the positioning portion 40 of the base member 10, and is formed integrally with the lower wall surface 41*bd*. However, the present invention is not limited thereto, and each rib 43 may extend so as to project from the bottom wall portion 11, which is located on the far side with respect to the engagement recess portion 41 of the base member 10, toward the near side, and may be formed integrally with the bottom wall portion 11. In this structure, a gap may be formed between the lower end of the rib 43 and the lower wall surface 41*bd*.

Figure 7:
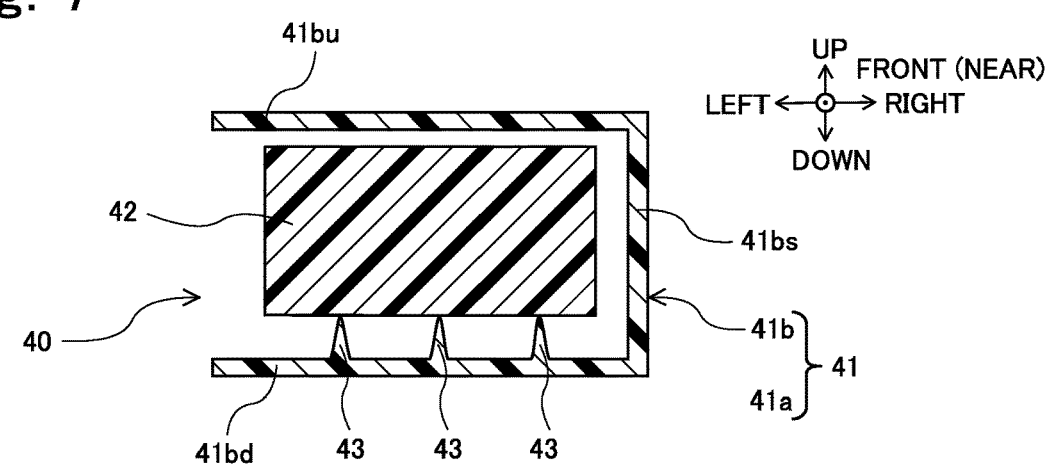
FIG. 7 is a cross-sectional view illustrating a positional relationship between the base member and the lid at the lid closed position of the lid opening/closing device of the embodiment.

In the above embodiment, as shown in FIG. 3, FIG. 5, and FIG. 7, the engagement projection portion 42 is formed so as to have a quadrangular cross-section, and the upper surface of the engagement projection portion 42 is flat. However, the present invention is not limited thereto, and the upper surface of the engagement projection portion 42 may be raised upward in a projection shape or a mountain shape such that the height position thereof changes in the right-left direction Y. According to this modification, even if water enters the upper surface of the engagement projection portion 42, the water is less likely to accumulate on the upper surface of the engagement projection portion 42, so that the upper surface of the engagement projection portion 42 and the engagement recess portion 41 are prevented from being fixed to each other due to freezing.

In the above embodiment, the lower wall surface 41*bd* of the engagement recess portion 41 is inclined downward from the far side to the near side of the engagement recess portion 41 at the closed position of the lid 20, and each rib 43 is formed in a plate shape so as to extend from the far side toward the near side of the engagement recess portion 41 while extending in the up-down direction Z at the closed position of the lid 20. However, the present invention is not limited thereto, and may be applied to a configuration in which the lower wall surface 41*bd* of the engagement recess portion 41 is inclined in the right-left direction Y of the engagement recess portion 41 at the closed position of the lid 20 and each rib 43 is formed in a plate shape so as to extend in the right-left direction Y of the engagement recess portion 41 while extending in the up-down direction Z at the closed position of the lid 20.

In the inclination structure of this modification as well, even if water enters the lower wall surface 41*bd*, the water flows on the lower wall surface 41*bd* from the upper side to the lower side and is discharged from the lower end (the right end or the left end) of the lower wall surface 41*bd* to the outside. Therefore, water is made less likely to accumulate on the lower wall surface 41*bd*, so that expansion of a range where water between the engagement recess portion 41 and the engagement projection portion 42 is frozen along with accumulation of a large amount of water on the lower wall surface 41*bd* is suppressed. Accordingly, the performance of preventing the base member 10 and the lid 20 from being fixed to each other due to freezing at the lid closed position is improved.

The present invention is not limited to the above-described embodiment and modifications, and various changes may be made without departing from the gist of the present invention. In addition, the present specification discloses not only the technical concept indicated by the citation relationship between the claims as originally filed, but also the technical concept obtained by combining the matters recited in each claim as appropriate.

This application claims priority on Japanese Patent Application No. 2022-180259 filed in Japan on Nov. 10, 2022, the entire contents of which are incorporated herein by reference.

The invention claimed is:

1. A lid opening/closing device comprising:
a base member provided with an opening;
a lid configured to be opened/closed between a closed position at which the lid closes the opening and an opened position at which the lid opens the opening; and
a positioning portion configured to position at least a vertical position of the lid relative to the base member at the closed position of the lid, wherein
the positioning portion includes
an engagement recess portion provided to one of the base member and the lid in a recess shape, and
an engagement projection portion provided to another of the base member and the lid in a projection shape and configured to be engaged with the engagement recess portion at least in an up-down direction at the closed position of the lid,
one of the engagement recess portion and the engagement projection portion includes a rib extending in the up-down direction at the closed position of the lid,
the rib is engaged at a distal end thereof with another of the engagement recess portion and the engagement projection portion at the closed position of the lid,
the engagement recess portion has a lower wall surface inclined with respect to a horizontal at the closed position of the lid,
the lower wall surface is inclined downward from a far side to a near side of the engagement recess portion at the closed position of the lid, and
the rib is formed in a plate shape so as to extend from the far side toward the near side of the engagement recess portion while extending in the up-down direction at the closed position of the lid.

2. The lid opening/closing device according to claim 1, wherein the rib is provided to the engagement recess portion and extends upward from the lower wall surface at the closed position of the lid.

3. The lid opening/closing device according to claim 1, wherein the rib is provided to the engagement projection portion and extends downward from a lower surface of the engagement projection portion at the closed position of the lid.

4. The lid opening/closing device according to claim 1, wherein
the lower wall surface is inclined in a right-left direction of the engagement recess portion at the closed position of the lid, and
the rib is formed in a plate shape so as to extend in the right-left direction of the engagement recess portion while extending in the up-down direction at the closed position of the lid.

5. The lid opening/closing device according to claim 4, wherein the rib is provided to the engagement recess portion and extends upward from the lower wall surface at the closed position of the lid.

6. The lid opening/closing device according to claim 4, wherein the rib is provided to the engagement projection portion and extends downward from a lower surface of the engagement projection portion at the closed position of the lid.

* * * * *